United States Patent [19]

Seri et al.

[11] Patent Number: 5,468,309
[45] Date of Patent: Nov. 21, 1995

[54] HYDROGEN STORAGE ALLOY ELECTRODES

[75] Inventors: Hajime Seri, Izumiohtsu; Yasuharu Yamamura, Katano; Yoichiro Tsuji; Yoshio Moriwaki, both of Osaka; Tsutomu Iwaki, Yawata, all of Japan

[73] Assignee: Matsushita Electric Industrial Co., Ltd., Osaka, Japan

[21] Appl. No.: 120,244

[22] Filed: Sep. 13, 1993

[30] Foreign Application Priority Data

Sep. 14, 1992 [JP] Japan ................... 4-244530
Nov. 2, 1992 [JP] Japan ................... 4-294215
Nov. 2, 1992 [JP] Japan ................... 4-294216

[51] Int. Cl.$^6$ ......................... C22C 22/00
[52] U.S. Cl. .................. 148/421; 420/900; 420/422; 429/218; 429/224; 423/644
[58] Field of Search ................... 148/421; 420/422, 420/900; 429/218, 224; 423/644

[56] References Cited

U.S. PATENT DOCUMENTS

| | | | |
|---|---|---|---|
| 4,716,088 | 12/1987 | Reichman et al. | 429/101 |
| 4,837,119 | 6/1989 | Ikoma et al. | 429/206 |
| 4,946,646 | 8/1990 | Gamo et al. | 420/415 |
| 5,096,667 | 3/1992 | Fetcenko | 420/580 |
| 5,149,383 | 9/1992 | Seri et al. | 148/400 |
| 5,205,985 | 4/1993 | Seri et al. | 420/422 |
| 5,278,001 | 1/1994 | Ono et al. | 420/900 |

FOREIGN PATENT DOCUMENTS

| | | |
|---|---|---|
| 1-48370 | 2/1989 | Japan . |
| 1-60961 | 3/1989 | Japan . |
| 1-102855 | 4/1989 | Japan . |
| 3-289041 | 12/1991 | Japan . |
| 4-63240 | 2/1992 | Japan . |

OTHER PUBLICATIONS

Ovshinsky et al. Science 260 (Apr. 1993) 176.

Primary Examiner—David A. Simmons
Assistant Examiner—Margery S. Phipps
Attorney, Agent, or Firm—Ratner & Prestia

[57] ABSTRACT

A hydrogen storage alloy electrode comprising a hydrogen storage alloy having a major phase of C15 ($MgCu_2$) type Laves phase with a composition expressed as $ZrMn_wM_xCr_yNi_z$ (where M is one or more elements selected from V and Mo), or its hydride. In this formula, one composition range is $0.6 \leq w \leq 0.8$, $0.1 \leq x \leq 0.3$, $0 < y \leq 0.2$, and $1.2 \leq z \leq 1.5$, and the other composition range is $0.6 \leq w \leq 0.8$, $0.1 \leq x \leq 0.3$, $0 < y \leq 0.2$, and $0.8 \leq z \leq 1.2$.

11 Claims, 4 Drawing Sheets

HYDROGEN STORAGE ALLOY ELECTRODES

FIELD OF THE INVENTION

The present invention relates to hydrogen storage alloy electrodes which are capable of reversibly absorbing and desorbing hydrogen in electrochemical processes.

BACKGROUND OF THE INVENTION

There have been lead-acid batteries and alkaline batteries widely used as storage battery cells for various power supplies. Among them, the alkaline storage batteries are high in reliability and can be reduced in size and weight, and hence have been used widely, the small size thereof for various portable devices and the large size in industrial applications.

In the alkaline storage batteries, positive electrodes have been made of nickel in most cases although there have been employed electrodes partly of air and silver oxide. The storage batteries have been improved in their performance as the electrodes have been changed from a pocket type to a sintered one, and have been used in wider fields as the batteries were permitted to be sealed.

On the other hand, most negative electrodes are made of cadmium at the present, although zinc, iron, hydrogen and the like besides cadmium have been considered for negative electrodes. In order to achieve a higher energy density, however, an interest has been directed to nickel-hydrogen storage batteries using metal hydrides, i.e, hydrogen storage alloys, and many proposals have been made for the production thereof.

In the alkaline storage battery employing a negative electrode made of a hydrogen storage alloy capable of reversibly absorbing and desorbing hydrogen, the hydrogen storage alloys have a theoretical capacity density greater than that of the cadmium electrode, and are free from deformation or formation of dendrites as experienced in the zinc electrode. It is expected that such hydrogen storage alloys are to be useful as a negative electrode for an alkaline storage battery possessing a high energy density, long life and free of pollution.

As the alloys used in such hydrogen storage alloy electrodes, multi-component alloys such as Ti-Ni, La-Ni, and Mm-Ni systems (Mm is a misch metal) are known.

The multi-component alloy of the Ti-Ni system may be classified as an AB type (A is an element having a high affinity for hydrogen such as La, Zr, Ti and the like; B is a transition element such as Ni, Mn, Cr and the like). This alloy is known to exhibit a relatively high discharge capacity at an initial stage of charging and discharging cycles, but it has a problem in that it is difficult to sustain the capacity for a long period of time while repeating the charging and discharging cycles.

Multi-component alloys of La-Ni or Mm-Ni systems classified as $AB_5$ type have been intensively developed recently as materials for electrodes, and in particular, the Mm-Ni system multi-component alloys are already in commercial use. These alloys show relatively small discharge capacity, short useful life as the electrode for a storage battery, and high material cost. There has therefore been a keen demand for a novel hydrogen storage alloy material having a large discharge capacity and a long service life.

In contrast, Laves phase alloy of an $AB_2$ type has a higher hydrogen absorbing ability, and has been considered promising for electrodes having a high capacity and long life. This alloy system has been already proposed as, for example, $ZrMo\alpha Ni\beta$ alloy (Laid Open Japanese Patent Application No. 1-48370), $Zr\alpha V\beta Ni\gamma M\delta$ alloy (Laid Open Japanese Patent Application No. 1-60961; where M is Mg, Ca, Y, Hf, Nb, etc.), AxByNiz alloy (Laid Open Japanese Patent Application No. 1-102855, where A is Zr, etc.; B is Ni, Cr, Mo, Mn, Fe, etc.), $Ab\alpha$ alloy (U.S. Pat. No. 4,946,646; where A is Zr, Ti, Hf, Ta, Y, etc.; B is Ni, V, Cr, Mn, Fe, etc.) and V-Ti-Zr-Ni-Cr alloy (U.S. Pat. No. 5,096,667).

When the Laves phase alloy of the $AB_2$ type is used for electrodes, a higher discharge capacity and a possible longer life can be realized as compared with those of the multi-component alloys of the Ti-Ni system or La (or Mm)-Ni system, and a further improvement of performance is expected. The prior inventors limited the alloy system to the Zr-Mn-M-Cr/Ni system (M is one or more elements selected from V and Mo), and specified the scope of its composition, thereby succeeding in obtaining hydrogen storage alloy electrodes possessing a discharge capacity of about 350 mAh/g (U.S. Pat. No. 5,149,383). The principal phase of the alloy of the hydrogen storage alloy electrodes is a C15 type Laves phase ($MgCu_2$ type face centered cubic structure), but phases other than the C15 type Laves phase are present in large amounts. It is therefore desireable to increase the homogeneity of the alloy, maintain the excellent cycle characteristics, and enhance the discharge capacity furthermore.

Incidentally, when a nickel-hydrogen storage battery is comprised of hydrogen storage alloy electrodes, the temperature of the storage battery is raised by hydrogenation heat of the hydrogen storage alloy in the negative electrode at the time of rapid charging. The hydrogen equilibrium pressure of the hydrogen storage alloy is also raised which causes elevation of the gas pressure in the battery, and hence the hydrogen storage capacity tends to decline.

SUMMARY OF THE INVENTION

The invention features a hydrogen storage alloy electrode large in discharge capacity.

The invention also features a hydrogen storage alloy electrode capable of maintaining the gas pressure in the battery low during rapid charging.

A hydrogen storage alloy electrode in one mode of the invention comprises a hydrogen storage alloy or its hydride, having the general formula $ZrMn_wM_xCr_yNi_z$, where M is one or more elements selected from V and Mo, and having the composition ratios of $0.6 \leq w \leq 0.8$, $0.1 \leq x \leq 0.3$, $0 < y \leq 0.2$, $1.2 \leq z \leq 1.5$, with the principal phase being a C15 ($MgCu_2$) type Laves phase. This hydrogen storage alloy electrode has an increased discharge capacity.

A hydrogen storage alloy electrode in another mode of the invention comprises a hydrogen storage alloy or its hydride, having the general formula $ZrMn_wM_xCr_yNi_z$, where M is one or more elements selected from V and Mo, and having the composition ratios of $0.6 \leq w \leq 0.8$, $0.1 \leq x \leq 0.3$, $0 < y \leq 0.2$, $0.8 \leq z < 1.2$, with the major phase being a C15 ($MgCu_2$) type Laves phase. This hydrogen storage alloy electrode lowers the gas pressure in the storage battery during rapid charging.

DESCRIPTION OF THE PREFERRED EMBODIMENTS

A hydrogen storage alloy of the $ZrMn_wM_xCr_yNi_z$ system of the present invention has a different compositional range from the conventional $Zr\alpha Mn\beta M\gamma Cr\delta Ni\epsilon$ alloy ($0.9 \leq \alpha \leq 1.1$, $0 \leq \beta \leq 0.5$, $0 < \gamma \leq 0.2$, $0 < \delta \leq 0.4$ and $1.2 \leq \epsilon \leq 1.3$) disclosed in the U.S. Pat. No. 5,149,383. That is, the hydrogen storage alloy of the present invention has a greater compositional ratio of Mn than the conventional hydrogen storage alloy, and the composition ratio of elements in addition to Mn are also defined in appropriate ranges.

According to the invention, one alloy has a ratio w of Mn, ratio x of M, ratio y of Cr and ratio z of Ni respectively of $0.6 \leq w \leq 0.8$, $0.1 \leq x \leq 0.3$, $0 < y \leq 0.2$ and $1.2 \leq z \leq 1.5$. According to the invention, the Mn ratio is larger and the upper limit of the Cr ratio is smaller as compared with the conventional alloy, and hence the amount of alloy phases present, other than the C15 type Laves phase, is very small, and the homogeneity of the alloy is notably improved. As a result, the amount of hydrogen to be absorbed and desorbed is increased. In the alloy, Ni plays the role of a catalyst for electrochemical absorption and desorption of hydrogen, and when the Ni ratio is 1.2 or more, the electrochemical activity is sufficient, and hence along with the increase in the amount of hydrogen absorption and desorption, the discharge capacity increases.

If the hydrogen storage alloy used in the electrode has a surface Mn concentration lower than that inside of the alloy, the alloy surface is less likely to corrode when charged and discharged in an alkaline electrolyte. Therefore, massive amounts of hydrogen may be absorbed and desorbed at higher electrochemical efficiency, so that a very stable performance may be maintained for a long period in spite of repeated charging and discharging cycles.

Therefore, the alkaline storage battery using this hydrogen storage alloy as an electrode, results in a storage battery that possesses a higher capacity, without sacrificing the long life characteristic, when compared with conventional batteries of this type.

In the case of the alloy with ratios of Mn, M, Cr and Ni respectively of $0.6 \leq w \leq 0.8$, $0.1 \leq x \leq 0.3$, $0 < y \leq 0.2$ and $0.8 \leq z \leq 1.2$, the Mn ratio is greater and the Ni ratio is smaller than in the conventional alloy, and therefore the hydrogen equilibrium pressure at a high temperature level (about 80° C.) during rapid charging is lowered. In this alloy, Ni is indispensable for the alloy to adsorb and desorb hydrogen electrochemically, and when the Ni ratio is decreased, the activity for electrochemical absorption and desorption of hydrogen is lowered, while the amount of hydrogen absorption increases, so that the discharge capacity of the conventional hydrogen storage alloy electrode may be nearly maintained.

In this alloy, when the surface Mn concentration is lower than that inside the alloy and the alloy is used as the electrode, the alloy surface is less likely to corrode when charged and discharged in an alkaline electrolyte, so that the hydrogen may be absorbed and desorbed with excellent electrochemical efficiency.

Therefore, the alkaline storage battery having an electrode of this alloy, for example, the nickel-hydrogen storage battery can maintain gas pressure in the storage battery at a lower pressure than in the conventional battery of this type even at high temperature during rapid charging, and hence a high capacity may be realized without causing electrolyte to leak.

EMBODIMENT 1

Using commercial Zr, Mn, V, Mo, Cr, Ni metals as raw materials, by heating and melting in an argon atmosphere in an arc furnace, the alloys having the compositions shown in Table 1 were fabricated. However, in the case of Mn ratios of 0.8 or more, when manufactured in an arc furnace, a large amount of Mn is evaporated and the desired alloy cannot be obtained, and hence it was fabricated in an induction furnace. Subsequently, the alloys were heat treated for 12 hours at 1100° C.

TABLE 1

| Sample No. | Alloy composition |
| --- | --- |
| 1 | $ZrMn^{0.9}V^{0.2}Cr^{0.1}Ni^{1.2}$ |
| 2 | $ZrMn^{0.4}V^{0.1}Cr^{0.1}Ni^{1.6}$ |
| 3 | $ZrMn^{0.6}Mo^{0.2}Cr^{0.3}Ni^{1.2}$ |
| 4 | $ZrMn^{0.5}V^{0.4}Cr^{0.1}Ni^{1.2}$ |
| 5 | $ZrMn^{0.5}Mo^{0.4}Cr^{0.1}Ni^{1.2}$ |
| 6 | $ZrMn^{0.6}V^{0.2}Cr^{0.2}Ni^{1.2}$ |
| 7 | $ZrMn^{0.6}V^{0.1}Cr^{0.1}Ni^{1.2}$ |
| 8 | $ZrMn^{0.7}V^{0.2}Cr^{0.1}Ni^{1.2}$ |
| 9 | $ZrMn^{0.6}V^{0.2}Cr^{0.1}Ni^{1.2}$ |
| 10 | $ZrMn^{0.6}V^{0.3}Cr^{0.1}Ni^{1.2}$ |
| 11 | $ZrMn^{0.6}V^{0.2}Cr^{0.1}Ni^{1.3}$ |
| 12 | $ZrMn^{0.8}V^{0.2}Cr^{0.1}Ni^{1.2}$ |
| 13 | $ZrMn^{0.65}V^{0.25}Cr^{0.1}Ni^{1.2}$ |
| 14 | $ZrMn^{0.7}V^{0.2}Cr^{0.05}Ni^{1.2}$ |
| 15 | $ZrMn^{0.6}V^{0.2}Cr^{0.1}Ni^{1.4}$ |
| 16 | $ZrMn^{0.6}Mo^{0.2}Cr^{0.2}Ni^{1.2}$ |
| 17 | $ZrMn^{0.6}Mo^{0.2}Cr^{0.1}Ni^{1.2}$ |
| 18 | $ZrMn^{0.6}Mo^{0.3}Cr^{0.1}Ni^{1.2}$ |
| 19 | $ZrMn^{0.6}Mo^{0.2}Cr^{0.1}Ni^{1.3}$ |
| 20 | $ZrMn^{0.8}Mo^{0.2}Cr^{0.1}Ni^{1.2}$ |
| 21 | $ZrMn^{0.7}Mo^{0.2}Cr^{0.05}Ni^{1.2}$ |
| 22 | $ZrMn^{0.6}V^{0.15}Mo^{0.05}Cr^{0.1}Ni^{1.2}$ |
| 23 | $ZrMn^{0.7}V^{0.1}Mo^{0.1}Cr^{0.1}Ni^{1.2}$ |
| 24 | $ZrMn^{0.7}V^{0.5}Mo^{0.05}Cr^{0.1}Ni^{1.2}$ |
| 25 | $ZrMn^{0.6}V^{0.1}Mo^{0.1}Cr^{0.1}Ni^{1.3}$ |
| 26 | $ZrMn^{0.6}V^{0.25}Mo^{0.05}Cr^{0.1}Ni^{1.2}$ |

Some of the alloy samples were analyzed by X-ray diffraction and other methods. Measurement of hydrogen absorption and desorption in a hydrogen gas atmosphere, that is, measurement of ordinary P-C-T (hydrogen pressure—composition—isotherm) was made, while the remaining samples were evaluated for electrode characteristics.

Sample Nos. 1 to 5 are comparative examples, and sample Nos. 6 to 26 are examples of the invention. First, in each alloy sample, X-ray diffraction analysis was conducted. As a result, the principal component of alloy phase of all alloy samples was identified to be C15 type Laves phase ($MgCu^2$ type fcc structure), but the amount of alloy phases other than the C15 phases were high in sample Nos. 3 to 5. After vacuum heat treatment, the peak of the Fcc phase was higher and sharper than before heat treatment, and it was found that heat treatment causes the amount of C15 type Laves phase to increase and thus enhance the homogeneity and crystallinity of the alloy. In particular, at an Mn content of 0.6 or more, alloys of uniform composition were obtained. The crystal lattice constant was smaller than 7.04A angstrom in sample No. 2, but was within a range of 7.04A to 7.10A angstrom in all other samples.

Consequently, in the alloy samples, P-C-T was measured at 70° C. Comparing sample Nos. 1 to 5 with sample Nos. 6 to 26, sample No. 2 was found to have a large hydrogen equilibrium pressure, and sample Nos. 3 to 5 were poor in the flatness of the plateau property. Excluding samples 2–5, there was no significant difference in the hydrogenation characteristic among alloy samples, and the hydrogen absorption amount H/M, (number of hydrogen mols absorbed in one atom of metal), was from 1.0 to 1.2, which was 10 to 30% greater than that of sample Nos. 2 to 5. In all samples, vacuum heat treatment improved the flatness of the plateau property and increased hydrogen absorption as compared to these characteristics before heat treatment.

In these alloy samples, half cell tests were conducted in order to evaluate the electrode characteristics as the negative electrodes for alkaline storage batteries by electrochemical charging and discharging reaction.

Samples of alloy Nos. 1 to 26 were ground to a particle size of 400 mesh or less, and immersed in an aqueous solution of 30 wt. % potassium hydroxide for 1 hour at room temperature, then washed in water and dried. By sufficiently mixing and agitating 1 g of the alloy powder, 3 g of carbonyl nickel powder as a conductive agent, and 0.12 g of polyethylene fine powder as binder, a disk of 24.5 mm in diameter and 2.5 mm in thickness was formed by pressing. The disk was heated in vacuum for 1 hour at 130° C. and the binder was melted, and a hydrogen storage alloy electrode was formed.

Figure 1:
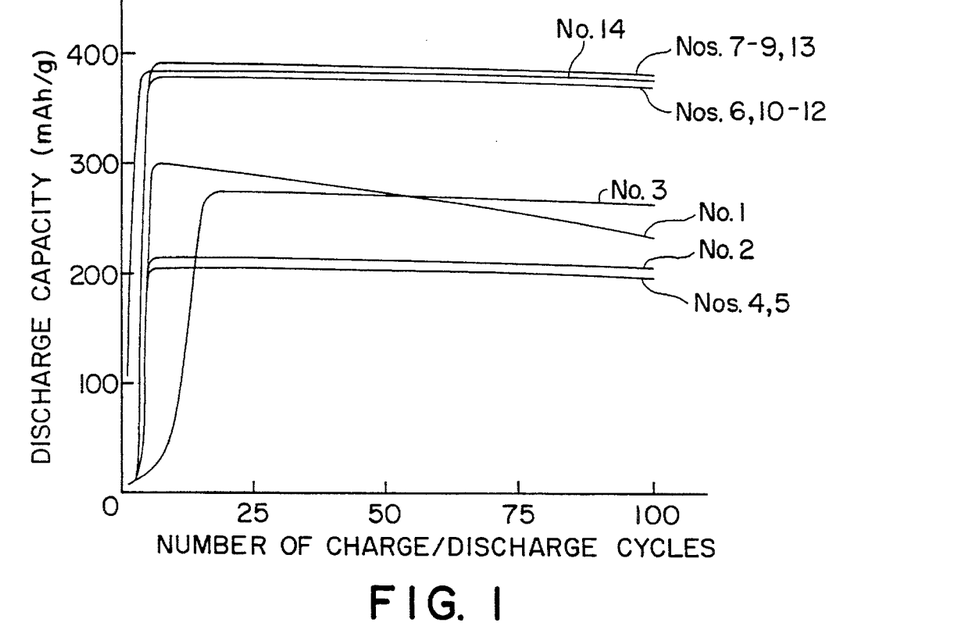
FIG. 1 and FIG. 2 are diagrams showing the discharge capacity versus the number of charging and discharging cycles in cell tests of various alloys shown in Table 1.
Figure 2:
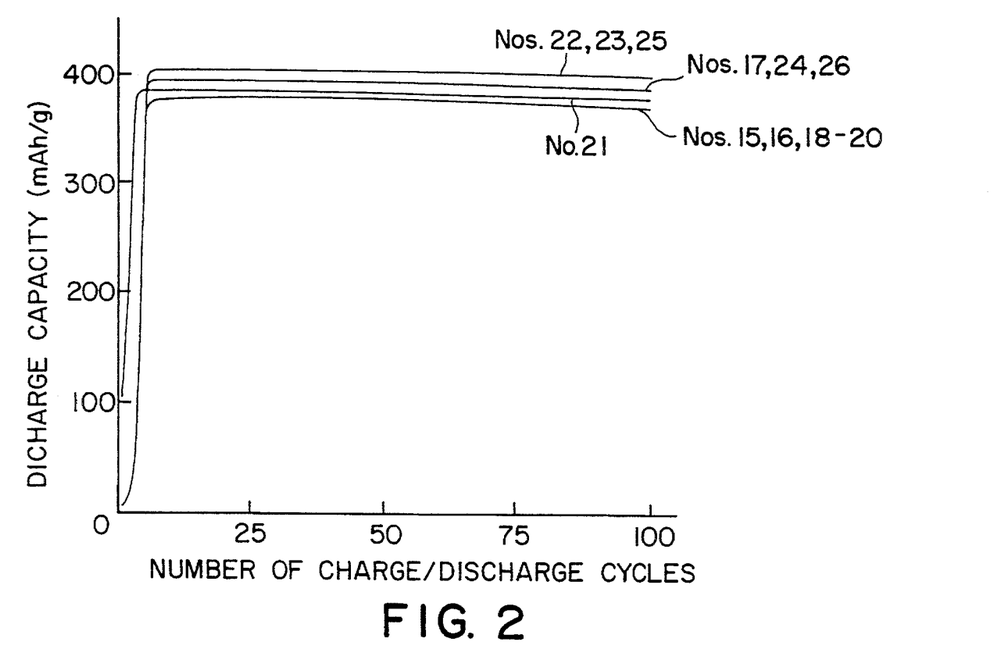

A lead of nickel wire was fitted to the hydrogen storage alloy electrode as a negative electrode, while a sintered nickel electrode possessing an excessive capacity was used as a positive electrode. A polyamide nonwoven cloth was used as a separator, an aqueous solution of potassium hydroxide with specific gravity of 1.30 was used as an electrolyte, and charging and discharging were repeated at 25° C. with the discharge capacity measured in each cycle. The charge was 100 mA× 5 hours per 1 g of hydrogen storage alloy, and discharge was conducted until the voltage reached 0.8V at 50 mA per 1 g. The results are shown in FIG. 1 and FIG. 2. In both FIG. 1 and FIG. 2, the abscissa denotes the number of charging and discharging cycles, and the ordinate represents the discharge capacity per 1 g of alloy. The numbers in the diagrams coincide with the sample numbers in Table 1. It is known from FIG. 1 that sample Nos. 1 to 5 are small in discharge capacity after 100 cycles, that is, 200 to 270 mAh/g. This is thought to occur because the amount of Mn is very large in sample No. 1, and the elution of Mn is very high when immersed in the alkaline solution, the alloy composition is greatly changed, and therefore the discharge capacity is decreased. In sample Nos. 2 to 5, since the absorption and desorption of hydrogen are small, the discharge capacity is also small. By contrast, using the hydrogen storage alloys of sample Nos. 6 to 26, since the homogeneity of alloy is very large, the discharge capacity for all samples is very large, being about 370 to 400 mAh/g, and the stability of the high capacity could be maintained during repeated charging and discharging cycles.

Using these hydrogen storage alloy electrodes, enclosed nickel-hydrogen storage batteries were fabricated according to the following method.

From the alloys shown in Table 1, eight alloys were selected, (sample Nos. 6, 9, 12, 14, 17, 21, 23, and 26) ground to powder of 400 mesh or less, immersed in alkaline solution using the same method as mentioned above, washed in water, and dried. Each alloy powder was mixed and agitated with a diluted solution of carboxymethyl cellulose (CMC) to form paste, and charged into an electrode support being a foamed nickel sheet, having mean pore size of 150 μm, porosity of 95% and thickness of 1.0 mm. The sample was dried at 120° C., pressed by a roller press, and surface coated with fluororesin powder to form a hydrogen storage alloy electrode.

The electrode was adjusted to a width of 3.3 cm, length of 21 cm, and thickness of 0.40 mm, and lead plates were fitted at two specified positions. Combined with a positive electrode and separator, the three layers were spirally laminated into a cylindrical form and put into a cell of SC size. The positive electrode was a known foamed nickel electrode, having a width of 3.3 cm and length of 18 cm. For the positive electrode the lead plates were fitted at two positions. As the separator, a hydrophilic polypropylene nonwoven cloth was used, and the electrolyte was prepared by dissolving 30 g/l of lithium hydroxide in a potassium hydroxide aqueous solution having a specific gravity of 1.20. An enclosed sealed cell was prepared. The capacity of the battery is defined by the positive electrode, and the theoretical capacity was set at 3.0 Ah.

Thus fabricated batteries were evaluated using the conventional charging and discharging cycle test. That is, charging up to 150% at 0.5 C (2-hour rate) and discharging to final voltage of 1.0 V at 0.2C (5-hour rate) Charging and discharging cycles were repeated at 20° C. As a result, in all batteries, for the initial charging and discharging cycles, the actual discharge capacity was lower than the theoretical capacity, but after 10 to 15 cycles of charging and discharging, they reached the theoretical capacity of 3.0 Ah, and a stable battery performance was maintained during up to 500 cycles of the charging and discharging tests.

In the electrode using the hydrogen storage alloy having the composition of $ZrMn_wM_xCr_yNi_z$ (M is one or more elements selected from V or Mo), with w, x, y, and z being defined as $0.6 \leq w \leq 0.8$, $01 \leq x \leq 0.3$,, $0 < y \leq 0.2$, $1.2 \leq z \leq 1.5$, since the homogeneity of the alloy is very high, the discharge capacity is as large as 370 to 400 mAh/g, an increas of about 10% as compared with that of the conventional hydrogen storage alloy electrode disclosed in U.S. Pat. No. 5,149,383. If the charging and discharging cycles are repeated, the high capacity stability can be maintained, so that the long life characteristic of the conventional hydrogen storage alloy electrodes may be maintained.

In U.S. Pat. No. 5,149,383, the Mn ratio w is defined as $0 \leq w \leq 0.5$, and Cr ratio y as $0 < y \leq 0.4$. In the present invention, by increasing the Mn ratio and lowering the upper limit of the Cr ratio, the homogeneity of the alloy is improved, and the hydrogen absorbing and desorbing capacities are increased. In particular, Mn has a large effect on the homogeneity of alloy, and by increasing the Mn ratio, although the alloy homogeneity is improved, if the Mn ratio w exceeds 0.8, to the contrary, the homogeneity tends to decrease. In the hydrogen storage alloy of the Zr-Mn-V-Cr-Ni system, the major phase of the alloy is the C15 type Laves ($MgCu_2$ type for structure), but when the Mn ratio exceeds, 0.8, the amount of C14 type Laves phase present ($MgZn_2$ type hexagonal structure) increases. In the $AB_2$ type alloy, there is $ZRMn_2$, which is a C14 type Laves phase, and therefore it seems that its nature is reflected when the Mn amount ratio w exceeds 0.8. In the $AB_2$ type Laves phase alloy, since homogeneity of alloy is largely influenced by the type of constituent elements and their composition ratio, it is very difficult to define the composition, but as for the Mn ratio w, as mentioned above, a proper range is $0.6 \leq w \leq 0.8$. In the case of Cr, if too much Cr is contained in the alloy, the C14 type Laves phase is likely to increase, and the homogeneity of the alloy is lowered, but Cr is a necessary element for maintaining the cycle life characteristics. Accordingly, by lowering the upper limit of the range of the Cr ratio y to the minimum limit, that is, by defining a range of $0<y \leq 0.2$, the homogeneity of the alloy may be enhanced in addition to the effect of an increase in the Mn amount ratio. Furthermore, Since Cr is low in activity in relation to electrochemical absorption and desorption of hydrogen, by lowering the upper limit of the Cr ratio, the electrochemical activity is increased, and the discharge capacity is notably increased. If the Cr ratio y is smaller than the M ratio x (M is one or more elements selected from V and Mo), the hydrogen equilibrium pressure is lowered, and the discharge capacity is particularly increased. Hence, the relation between the Cr ratio y and M ratio x is desired to be $y \leq x$.

M contributes to the increase in the amount of hydrogen absorption and desorption, and Ni induces lowering of the amount of hydrogen absorption and desorption, but contributes to increasing of activity relating to electrochemical absorption and desorption of hydrogen. However, if the M amount ratio x is less than 0.1, the effect of M is small, and if the M ratio exceeds 0.3, the homogeneity of the alloy is largely lowered, and the amount of hydrogen absorption and desorption decreases. Meanwhile, if the Ni ratio z is greater than 1.5, the hydrogen equilibrium pressure is very high, and the amount of hydrogen absorption and desorption decreases, and if the Ni ratio z is less than 1.2, the activity level of electrochemical hydrogen absorption and desorption decreases, and the discharge capacity tends to decline. Therefore, the M ratio x and Ni ratio z should preferably be in a range of $0.1 \leq x \leq 0.3$, $1.2 \leq z \leq 1.5$. However, since M and Ni bring about mutually opposite effects, the balance of M ratio x and Ni ratio z is important, and when z-x is 1.2 or less, the hydrogen absorption and desorption are particularly large. Hence, it is desired that the relation of z-x should be $\leq 1.2$.

Therefore, if the sum of the ratios of Mn, M, Cr and Ni, w+x+y+z, becomes smaller than 2.0, the ratio of Zr being high, the affinity for hydrogen is high, and the stability of the absorbed hydrogen is hence high, so that the hydrogen is rarely desorbed. To the contrary, if the sum w+x+y+z is larger than 2.4, the ratios of Mn, Cr and Ni being low in affinity for hydrogen is higher, and hydrogen is hardly absorbed. Hence the ratio is desired to be in a range of $2.0 \leq w+x+y+Z \leq 2.4$.

If the crystal lattice constant is smaller than 7.04A angstrom, absorption and desorption of hydrogen decreases, and the discharge capacity becomes smaller, and if greater than 7.10A angstrom, the stability of hydride is significantly lowered, and the hydrogen absorption drops. Therefore the crystal lattice constant a is desired to be in a range of $7.04 \leq a \leq 7.10$.

Heat treatment to homogenize the alloy after fabricating, enhances the homogeneity and crystallinity of the alloy, and the discharge capacity is particularly enhanced. If, however, the heat treatment temperature is less than 1000° C. there is no effect from heat treatment, and if higher than 1300° C. too much Mn is evaporated disturbing the alloy composition severely, and the discharge capacity is decreased. If the heat treatment time is shorter than an hour, the effect of heat treatment does not appear sufficient, and hence it is desired to heat for an hour or more. Besides, to prevent oxidation of the alloy, it is preferred to heat in vacuum or in inert gas atmosphere. It is therefore preferred to homogenize the alloy after fabrication by heating in a vacuum or in an inert gas atmosphere at 1000° to 1300° C. U.S. Pat. No. 5,149,383 discloses that the alloy surface in the alkaline electrolyte is likely to corrode if the Mn ratio exceeds 0.5, thereby lowering the discharge capacity. However, in the present invention by lowering the Mn concentration on the alloy surface as compared with that inside of the alloy, corrosion of the alloy surface by the electrolyte during charging and discharging can be prevented. A simple and preferred method of lowering the concentration of Mn on the alloy surface, after grinding the hydrogen storage alloy, is by immersing in an alkaline solution or acidic solution. However, if the Mn ratio exceeds 0.8, by immersing in an alkaline solution or acidic solution, too much Mn is eluted thus disturbing the alloy composition severely, and hence the discharge capacity declines. The method of treatment of hydrogen storage alloy, the method of immersing the alloy in alkaline solution or acidic solution is proposed in U.S. Pat. Nos. 4,716,088 and 4,837,119. In U.S. Pat. No. 4,716,088, however, the treatment relates to a method of enhancing the charge acceptability or promoting the electrochemical transition speed of hydrogen, while U.S. Pat. No. 4,837,119 presents a method of enhancing the cycle life characteristic when using the Mm-Ni system alloy electrode of the $AB_5$ type. By contrast, in the present invention, immersion in alkaline solution or acidic solution is only a technique for lowering the concentration of Mn on the alloy surface as compared with that inside the alloy, which is essentially different from the teaching of U.S. Pat. Nos. 4,716,088 and 4,837,119.

Using commercial Zr, Mn, V, Mo, Cr, Ni metals as raw materials, by heating and melting in an argon atmosphere in an arc furnace, the alloys having the compositions shown in Table 2 were fabricated. However, in the case of an Mn ratio of 0.8 or more, when manufactured in an arc furnace, too much Mn is evaporated and the intended alloy cannot be obtained, and hence it was fabricated in an induction furnace. Subsequently, heat treatment was applied for 12 hours at 1100° C.

TABLE 2

| Sample No. | Alloy composition |
|---|---|
| 31 | $ZrMn^{0.5}V^{0.1}Cr^{0.1}Ni^{1.3}$ |
| 32 | $ZrMn^{0.9}Mo^{0.1}Cr^{0.1}Ni^{1.1}$ |
| 33 | $ZrMn^{0.6}Mo^{0.2}Cr^{0.3}Ni^{1.1}$ |
| 34 | $ZrMn^{0.8}Mo^{0.3}Cr^{0.2}Ni^{0.7}$ |
| 35 | $ZrMn^{0.7}V^{0.2}Cr^{0.1}Ni^{1.1}$ |
| 36 | $ZrMn^{0.7}V^{0.3}Cr^{0.1}Ni^{1.1}$ |
| 37 | $ZrMn^{0.7}V^{0.3}Cr^{0.1}Ni^{1.0}$ |
| 38 | $ZrMn^{0.6}V^{0.3}Cr^{0.1}Ni^{1.1}$ |
| 39 | $ZrMn^{0.7}V^{0.3}Cr^{0.2}Ni^{1.0}$ |
| 40 | $ZrMn^{0.8}V^{0.2}Cr^{0.1}Ni^{1.0}$ |
| 41 | $ZrMn^{0.7}V^{0.2}Cr^{0.2}Ni^{1.1}$ |
| 42 | $ZrMn^{0.8}V^{0.1}Cr^{0.1}Ni^{1.1}$ |
| 43 | $ZrMn^{0.8}V^{0.3}Cr^{0.1}Ni^{0.9}$ |
| 44 | $ZrMn^{0.8}V^{0.3}Cr^{0.1}Ni^{0.8}$ |
| 45 | $ZrMn^{0.7}V^{0.2}Cr^{0.05}Ni^{1.1}$ |
| 46 | $ZrMn^{0.7}Mo^{0.2}Cr^{0.1}Ni^{1.1}$ |
| 47 | $ZrMn^{0.7}Mo^{0.3}Cr^{0.1}Ni^{1.0}$ |
| 48 | $ZrMn^{0.6}Mo^{0.3}Cr^{0.1}Ni^{1.1}$ |
| 49 | $ZrMn^{0.7}Mo^{0.2}Cr^{0.2}Ni^{1.1}$ |
| 50 | $ZrMn^{0.8}Mo^{0.1}Cr^{0.1}Ni^{1.1}$ |
| 51 | $ZrMn^{0.8}Mo^{0.3}Cr^{0.1}Ni^{0.8}$ |
| 52 | $ZrMn^{0.7}Mo^{0.2}Cr^{0.05}Ni^{1.1}$ |
| 53 | $ZrMn^{0.7}V^{0.1}Mo^{0.1}Cr^{0.1}Ni^{1.1}$ |
| 54 | $ZrMn^{0.7}V^{0.2}Mo^{0.1}Cr^{0.1}Ni^{1.1}$ |
| 55 | $ZrMn^{0.7}V^{0.25}Mo^{0.5}Cr^{0.2}Ni^{1.0}$ |
| 56 | $ZrMn^{0.8}V^{0.1}Mo^{0.2}Cr^{0.1}Ni^{0.9}$ |

Some of the alloy samples were analyzed by X-ray diffraction and other methods. Measurement of hydrogen absorption and desorption in hydrogen gas atmosphere, that is, measurement of P-C-T was made, while the remaining samples were evaluated for electrode characteristics.

Sample Nos. 31 to 34 are comparative examples, and sample Nos. 35 to 56 are embodiments of the invention. First, in each alloy sample, X-ray diffraction analysis was conducted. As a result, the principal component of alloy phase of all alloy samples was identified to be C15 type Laves phase ((MgCu$_2$ type fcc structure). After vacuum heat treatment, the peak of fcc phase was greater and sharper than before heat treatment, and hence heat treatment was found to cause an increase in the amount of C15 type Laves phase and improvement the homogeneity and crystallinity of the alloy. In particular, at the Mn ratio of 0.6 or more, alloys of identical composition were obtained.

Figure 3:
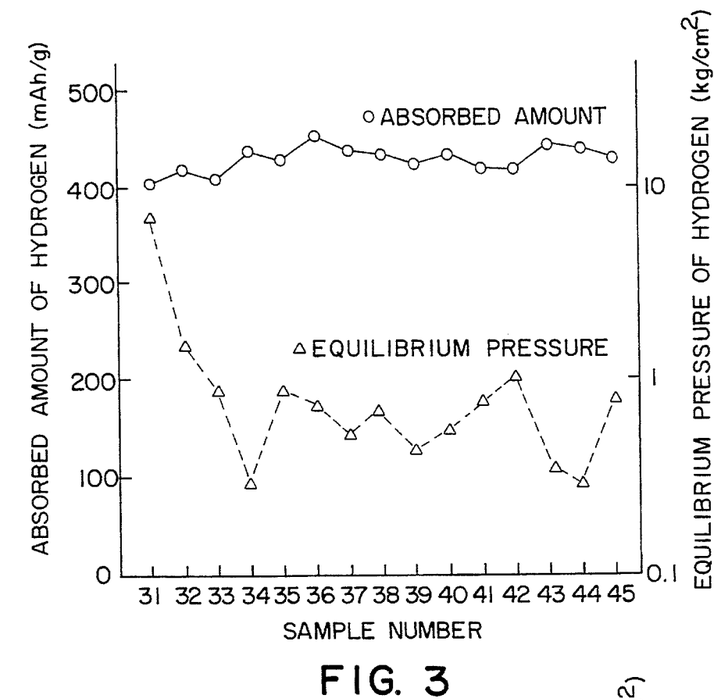
FIG. 3 and FIG. 4 are diagrams showing the hydrogen storage capacity and hydrogen equilibrium pressure for various alloys shown in Table 1.
Figure 4:
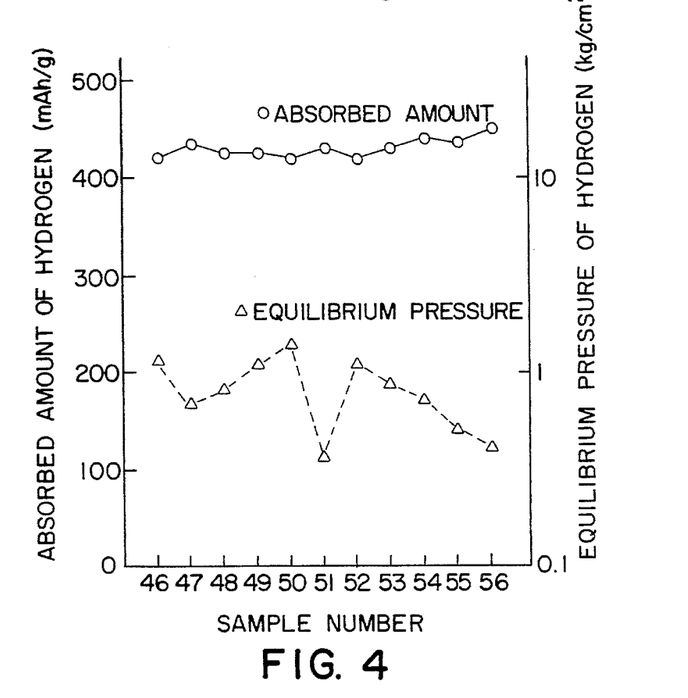

In the alloy samples, the P-C-T was measured at 70° C. The relation between hydrogen absorption and hydrogen equilibrium pressure is shown in FIG. 3 and FIG. 4. The hydrogen absorption is expressed as the electrical quantity (mAh/g) for the convenience of comparison with the discharge capacity by the electrochemical charging and discharging reaction of the alloy. It is known from the results disclosed in FIG. 3 and FIG. 4 that the hydrogen equilibrium pressure drops, while the hydrogen absorption amount increases, as the Ni ratio z decreases in the alloy $ZrMn_wM_x$-$Cr_yNi_z$ (M is one or more elements selected from V and Mo).

The alloy samples were subjected to half cell tests in order to evaluate the electrode characteristics as the negative electrode for an alkaline storage battery by electrochemical charging and discharging.

Figure 5:
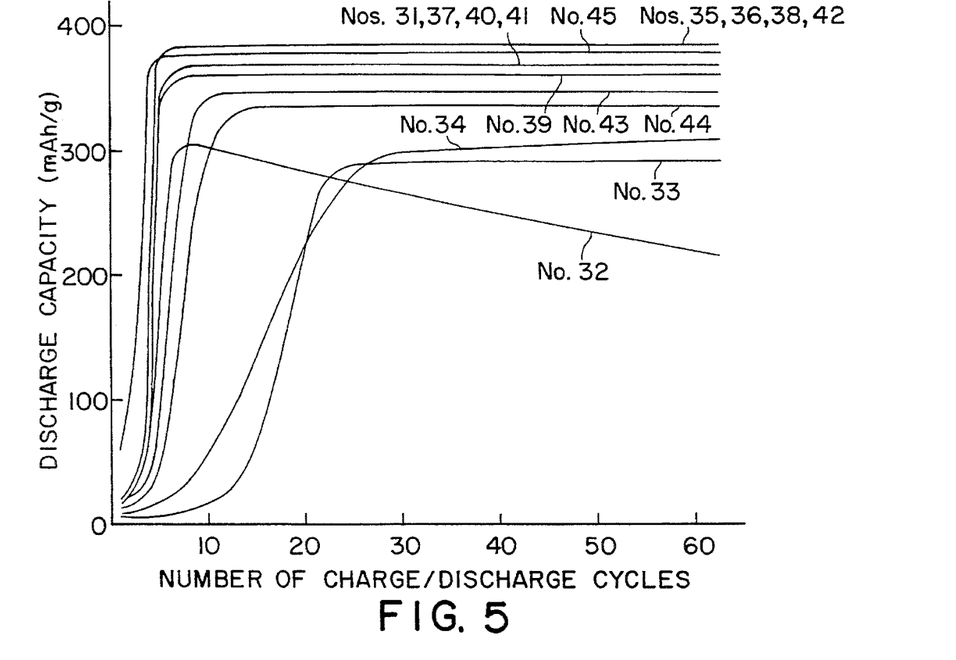
FIG. 5 and FIG. 6 are diagrams showing the discharge capacity versus the number of charging and discharging cycles in cell tests of various alloys shown in Table 2.
Figure 6:
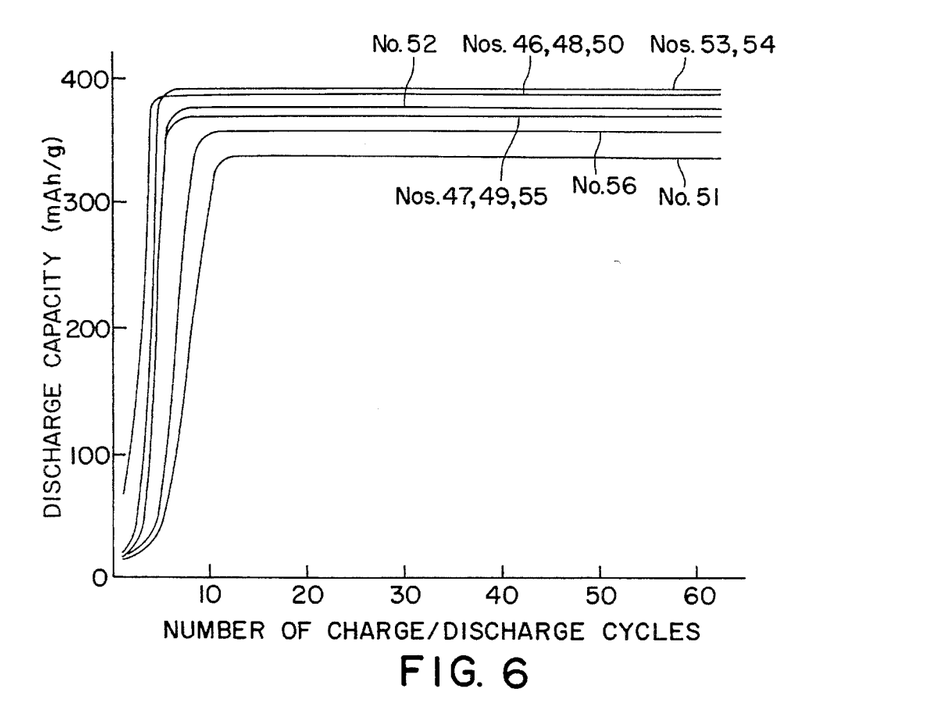

The sample fabrication method and experimental method are same as in Embodiment 1. However, in the case of a Mn ratio of 0.5 or less, that is, in sample No. 31, immersing in an alkaline solution was skipped. The results of half cell tests are shown in FIG. 5 and FIG. 6. In both FIG. 5 and FIG. 6, the abscissa denotes the number of charging and discharging cycles, while the ordinate represents the discharge capacity per 1 g of the alloy, with the numerals in the drawings corresponding to the sample numbers in Table 2. As known from the results in FIG. 5 and FIG. 6, with sample No. 32, since the Mn amount is very high, when immersed in alkaline solution, the elution of Mn was very high and the alloy composition was largely changed, and hence it was estimated that the discharge capacity decreased. In sample Nos. 33 and 34, the discharge capacity decreased because they were inferior in electrochemical activity. In all other alloy samples, No. 35 to No. 56, the discharge capacity was in a range of 340 to 390 mAH/g. Therefore, in the hydrogen storage alloy electrodes in sample Nos. 35 to 56, although the discharge capacity tended to be slightly lower than in the conventional ones, the discharge capacity seems to be equal to the conventional hydrogen storage alloy electrodes.

Using these hydrogen storage alloy electrodes, enclosed nickel-hydrogen storage batteries having the capacity defined by the positive electrodes were fabricated in the same manner as in Embodiment 1. The theoretical capacity was 3.0 Ah. In this case, too, sample No. 31 was not immersed in the alkaline solution. A pressure sensor was attached to each battery in order to measure the gas pressure in the battery, and the gas pressure in the battery during rapid charging was measured. In order to measure the changes of battery temperature, a thermocouple was attached to the sidewall of the battery.

In 20 cycles of charging at 30° C. and a current of 0.1C (10-hour rate), 120%, and discharging at a current of 0.2C (5-hour rate) up to 0.8 V, the hydrogen storage alloy electrodes were activated, and then the battery was charged at 0.2C up to a gas pressure of 5 kg/cm$^2$ and discharged at 0.2C up to 0.8 V. Five batteries were put in a plastic container, and charged to a gas pressure of 5 kg/cm$^2$ in the battery at 3C (⅓-hour rate). At this time, in all batteries, the temperature elevated to about 70° to 80° C. when charged. After charging and cooling the batteries to 30° C., the batteries were discharged to 0.8 V at 0.2C, and the discharge capacity was compared with the 0.2C charging.

Figure 7:
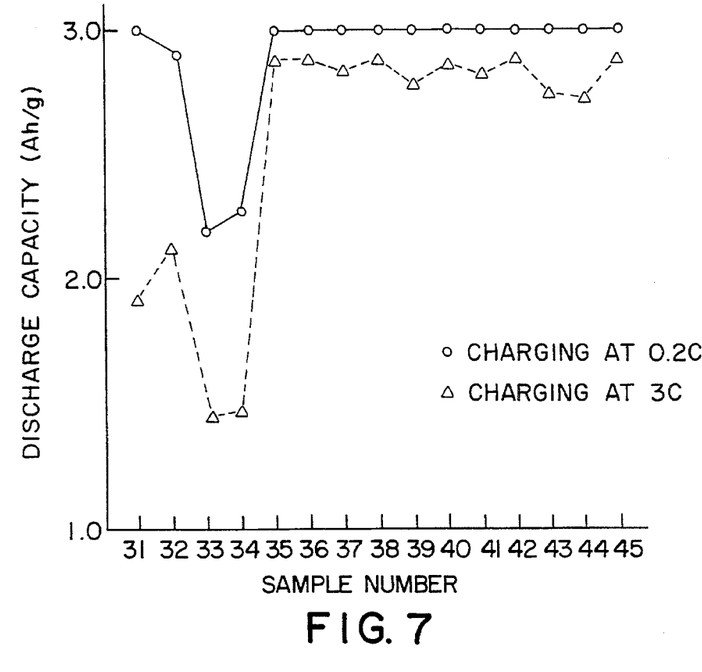
FIG. 7 and FIG. 8 are diagrams showing the discharge capacity in relation to rapid charging in the batteries using various alloys shown in Table 2.
Figure 8:
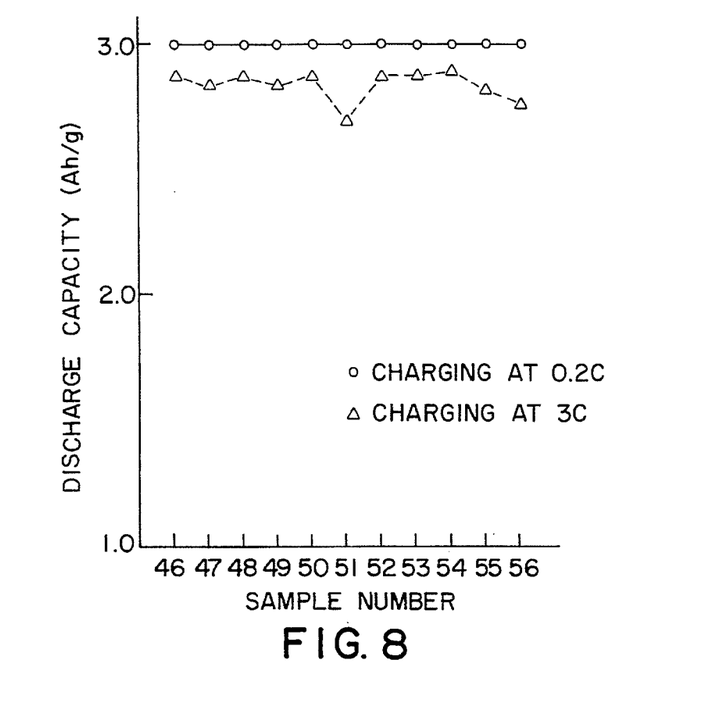

FIG. 7 and FIG. 8 record the discharge capacity in 0.2C charging and discharge capacity in 3C charging of the batteries using hydrogen storage alloy electrodes of the samples. As shown in FIG. 7 and FIG. 8, for sample No. 31, the hydrogen equilibrium pressure is high due to temperature rise of the battery in 3C charging, and it is considered to cause a drop of the discharge capacity. In sample Nos. 32 to 34, since the capacity as a hydrogen storage alloy electrode is small, the discharge capacity in both 0.2C charging and 3C charging dropped. By contrast, using the hydrogen storage alloy electrodes of sample Nos. 35 to 56, the highest discharge capacity was recorded in 0.2C charging and 3C charging.

The relation between the alloy composition and characteristics is described in detail.

By decreasing the Ni ratio from the conventional Zr-Mn-M-Cr-Ni system hydrogen storage alloy disclosed in U.S. Pat. No. 5,149,383, (M is one or more elements selected from V and Mo), the hydrogen equilibrium pressure at high temperature (about 80° C.) in rapid charging may be significantly lowered. When the Ni ratio is less than 1.2, the activity on electrochemical absorption and desorption of hydrogen decreases, but by increasing the Mn ratio, the homogeneity of the alloy is improved, and the hydrogen absorption is increased, so that the discharge capacity of the conventional hydrogen storage alloy electrode can almost be maintained. However, if the Ni ratio is less than 0.8, the activity on the electrochemical absorption and desorption of hydrogen is very small, and if the hydrogen absorption amount increases, it is electrochemically difficult to absorb and desorb hydrogen.

As mentioned in Embodiment 1, in the AB$_2$ type Laves phase alloy, the homogeneity of the alloy is substantially affected by the composition ratio of constituent elements. In the invention, the Ni ratio z is defined in a range of $0.8 \leq z < 1.2$, but in this case Mn has a great effect on the homogeneity of alloy. If this Mn ratio exceeds 0.6, it begins to exhibit its effect. However, if the Mn ratio increases to 0.8, the amount of the C14 type Laves phase (MgZn$_2$ type hexagonal structure) increases, and the alloy homogeneity tends to decline. Hence, a proper Mn ratio w is $0.6 \leq w \leq 0.8$. If Cr is present, the C14 type Laves phase is likely to increase, and when the Cr ratio y exceeds 0.2, the amount becomes very large, so that the absorption and desorption of hydrogen decrease. Therefore, a proper range of Cr ratio y is $0 < y \leq 0.2$. If the Cr ratio is smaller than the M amount ratio x, the hydrogen equilibrium pressure is further lowered, and the discharge capacity particularly increases. Hence, the relation between Cr ratio y and M ratio x is desired to be $y \leq x$.

If the sum of the ratios of Mn, M, Cr and Ni, $w + x + y + z$, becomes smaller than 2.0, the ratio of Zr being high in affinity for hydrogen is high, and the stability of the absorbed hydrogen is hence high, so that the hydrogen is rarely desorbed. To the contrary, if the sum $w+x+y+z$ is larger than 2.4, the ratios of Mn, Cr and Ni low in affinity for hydrogen are higher, and hydrogen is hardly absorbed. Hence the ratio is desired to be in a range of $2.0 \leq w+x+y+z \leq 2.4$.

After fabrication of the alloy, followed by heat treatment for homogenizing, the homogeneity and crystallinity of the alloy are improved, and hence the discharge capacity is particularly increased. However, if the heat treatment temperature is less than 1000° C., there is no effect from heat treatment, and if it is higher than 1300° C., too much Mn is evaporated which disturbs the alloy composition severely, and the discharge capacity is increased. If the heat treatment time is shorter than an hour, the effect of heat treatment does not appear to be sufficient, and hence it is desired to heat for an hour or more. Besides, to prevent oxidation of the alloy, it is preferred to heat in a vacuum or in an inert gas atmosphere. It is therefore preferred to homogenize the alloy after fabrication by heating in a vacuum or in an inert gas atmosphere at 1000° to 1300° C.

Hence, in order to obtain hydrogen storage alloy electrodes low in hydrogen equilibrium pressure, suitable for rapid charging and possessing high capacity, the alloy composition must be $ZrMn_wM_xCr_yNi_z$ (where M is one or more elements selected from V and Mo), with the w, x, y, and z ratios being defined as $0.6w \leq 0.8$, $0.1 \leq x \leq 0.3$, $0<y \leq 0.2$, $0.8 \leq z<1.2$.

It is known that the alloy surface is likely to corrode when the Mn ratio is more than 0.5. But, in the present invention, by lowering the Mn concentration on the alloy surface as compared with the level inside the alloy, corrosion of the alloy surface by the electrolyte in charging and discharging can be avoided. A simple and preferred method of lowering the concentration of Mn on the alloy surface, after grinding the hydrogen storage alloy, is by immersing in an alkaline solution or acidic solution. However, if the Mn ratio exceeds 0.8, by immersing in alkaline solution or acidic solution, too much Mn is eluted which disturbs the alloy composition severely, and hence the discharge capacity declines.

In Embodiments 1 and 2, samples of hydrogen storage alloy electrodes possessing a specific composition ratio were shown, but the scope of the invention is not limited to these samples alone, and covers the electrodes employing the hydrogen storage alloys in the composition ranges specified in the following claims. The hydrogen storage alloy electrodes of the invention are applicable not only in the illustrated nickel-hydrogen batteries, but also in silver oxide-hydrogen batteries and air-hydrogen batteries as well.

What is claimed:

1. A hydrogen storage alloy electrode comprising a hydrogen storage alloy or its hydride, wherein the major phase of the alloy is a Laves phase of C15 ($MgCu_2$) type, and the composition of the alloy is specified by the formula $ZrMn_wM_xCr_yNi_z$, in which M is at least one element selected from V and Mo, and $0.6 \leq w \leq 0.8$, $0.1 \leq x \leq 0.3$, $0<y \leq 0.2$, $1.2 \leq z \leq 1.5$, and the Mn concentration on the alloy surface is lower than that inside the alloy.

2. A hydrogen storage alloy electrode of claim 1, wherein the total ratio of Mn, M, Cr, and Ni is $2.0 \leq w+x+y+z \leq 2.4$.

3. A hydrogen storage alloy electrode of claim 1, wherein the ratio of Cr and M is $y \leq x$, and the ratio of Ni and M is $z-x \leq 1.2$.

4. A hydrogen storage alloy electrode of claim 1, wherein the crystal lattice constant a of said Laves phase is $7.04 \leq a \leq 7.10$ angstrom.

5. A hydrogen storage alloy electrode of claim 1, wherein said alloy, following fabrication, is heated to effect homogenization in a vacuum or an inert gas atmosphere at a temperature of 1000° to 1300° C.

6. A hydrogen storage alloy electrode of claim 1, wherein said alloy is immersed in an alkaline solution or an acidic solution after being ground.

7. A hydrogen storage alloy electrode comprising a hydrogen storage alloy or its hydride, wherein the major phase of the alloy is a Laves phase of C15 ($MgCu_2$) type, and the composition of the alloy is specified by the formula $ZrMn_wM_xCr_yNi_z$, in which M is at least one element selected from V and Mo, and $0.6 \leq w \leq 0.8$, $0.1 \leq x \leq 0.3$, $0<y \leq 0.2$, $0.8 \leq z<1.2$, and the Mn concentration on the alloy surface is lower than that inside the alloy.

8. A hydrogen storage alloy electrode of claim 7, wherein the total ratio of Mn, M, Cr, and Ni is $2.0 \leq w+x+y+z \leq 2.4$.

9. A hydrogen storage alloy electrode of claim 7, wherein the ratio of Cr and M is $y \leq x$.

10. A hydrogen storage alloy electrode of claim 7, wherein said alloy, following fabrication, is heated to effect homogenization in a vacuum or an inert gas atmosphere at a temperature of 1000° to 1300° C.

11. A hydrogen storage alloy electrode of claim 7, wherein said alloy is immersed in an alkaline solution or an acidic solution after being ground.

* * * * *